United States Patent [19]
Howeth

[11] Patent Number: 4,817,661
[45] Date of Patent: Apr. 4, 1989

[54] ADJUSTABLE ENERGY OUTPUT/CYCLIC EVENT FILTER CLEANING CONTROL SYSTEM

[76] Inventor: David F. Howeth, 233 Chuck Wagon Trail, Fort Worth, Tex. 76108

[21] Appl. No.: 112,535

[22] Filed: Oct. 21, 1987

[51] Int. Cl.⁴ .............................................. B01D 46/04
[52] U.S. Cl. ............................... 137/119; 137/624.14; 137/624.18; 55/273; 91/417 R
[58] Field of Search .................. 137/119, 624.14, 906, 137/624.18, 624.2; 91/417 R; 55/273, 283, 287

[56] References Cited

U.S. PATENT DOCUMENTS

3,916,768 11/1975 Mortin .............................. 91/417 R

Primary Examiner—Alan Cohan
Attorney, Agent, or Firm—Hubbard, Thurman, Turner & Tucker

[57] ABSTRACT

A series of filter backflushing valves are connected to a pressurized air storage tank and are sequentially opened at selectively variable time intervals by a piston and stepping cam structure reciprocably disposed within a cyclic control device intermittently pressure actuated by a backflushing pressure control valve which controls pressurized air flow from the tank to the control device, to actuate the same, through an actuating conduit by automatically opening when the tank pressure reaches a desired backflushing pressure level established by the valve setting. The lapse time between sequential backflushing valve openings may be varied independently of the selectively variable backflushing pressure by adjustment of the flow rate of pressurized supply air into the tank through a main supply conduit. Such flow rate adjustment is preferably effected by connecting the supply conduit to an available source of high pressure air and installing a pressure regulating valve and a fixed downstream orifice in the supply conduit and then adjusting the regulating valve to selectively vary the time required to raise the tank pressure from ambient pressure to the desired backflushing pressure etablished by the pressure control valve. The orifice establishes an essentially linear relationship between the regulating valve setting and the desired lapse time. A portion of the pressurized tank air intermittently discharged through the control valve is flowed into a reset pressure reservoir which uses the pressurized air received therein to automatically drive the piston and the cam structure back to a reset position thereof after it has caused the opening of one of the backflushing valves.

22 Claims, 2 Drawing Sheets

ADJUSTABLE ENERGY OUTPUT/CYCLIC EVENT FILTER CLEANING CONTROL SYSTEM

BACKGROUND OF THE INVENTION

The present invention relates generally to filter cleaning systems, and more particularly provides a unique automatic cyclic filter backflushing system in which the system lapse time and backflushing pressure may be selectively and independently varied, and the cyclic backflushing valve control portion thereof is automatically reset in a substantially improved manner, after the opening of each of the backflushing valves, using pressurized air cyclically received in and discharged from a reset storage reservoir.

The series of filter elements typically incorporated in a variety of particulate filtration systems, such as dust collection systems and the like, are commonly cleaned utilizing automatic filter backflushing systems which intermittently and quite rapidly discharge essentially the entire volume of pressurized air temporarily held within a main storage tank through one of a series of quick-opening backflushing valves each operatively associated with one of the filter elements or an interior segment thereof.

Opening of a particular backflushing valve creates from tank air discharged therethrough a high pressure, short duration air burst which flows in a reverse direction through the interior of the filter element to dislodge built-up particulate matter adhering to and impeding air flow through its exterior surface. A variety of automatically resettable cyclic control devices are utilized to open the backflushing valves in a predetermined sequence, with the tank being suitably recharged between the successive openings of different ones of the backflushing valves. Particularly effective automatic cyclic filter backflushing systems of this general type are disclosed and described in my U.S. Pat. Nos. 4,465,497 and 4,690,166.

In systems of this general character, there are four operational design criteria which are of particular importance: (1) the source and control of pressurized system-operating air supplied to the main storage tank, (2) control of the system backflushing pressure, (3) control of the system "lapse time" between the sequential openings of the backflushing valves, and (4) the resetting of the cyclic control device after each backflushing valve opening. To essentially maximize the applicational and operational flexibility of an automatic cyclic filter backflushing system it would be desirable to combinatively incorporate therein the ability to utilize as its backflushing and operating pressure source either an available, in-place pressurized air source (such as the typical, approximately 90 psig air commonly used to power pneumatic hand tools) or a dedicated system air compressor, the ability to selectively and independently vary both the system backflushing pressure and its lapse time to thereby accommodate the sometimes widely divergent flushing pressure and frequency requirements of different particulate filtration systems, and the ability to reliably reset the cyclic control device of the system without resort to often failure-prone electrical or mechanical devices, or pneumatic methods vulnerable to disturbances in the main pressurized supply air flow to the storage tank.

Conventional automatic cyclic filter backflushing systems have proven to be deficient as to at least one of the aforementioned design criteria. For example, the system disclosed in my U.S. Pat. No. 4,465,497 provides for selective variation of its backflushing pressure, but is specifically designed and operative to maintain an essentially constant lapse time which is unchanged by adjustments to the system's backflushing pressure. Further, the sequential resetting of the system's cyclic control device is pneumatically achieved utilizing, in opposition to each other, portions of the incoming tank supply air. In addition to being a somewhat inefficient method of resetting the cyclic control device, this technique also creates the possibility of disrupting the important reset process in the event that the main air supply to the system is disturbed in some fashion. The system set forth in my U.S. Pat. No. 4,690,166 is dependent upon a separate air compressor for its main air supply, and utilizes an internal spring element in its cyclic control device for reset purposes. Failure of this single spring element can render the entire system inoperative.

It is accordingly an object of the present invention to provide an improved automatic cyclic filter backflushing system which combines all of the aforementioned desirable system capabilities to thereby eliminate or at least substantially minimize the applicational and operational limitations commonly associated with conventional systems of this type.

SUMMARY OF THE INVENTION

In carrying out principles of the present invention, in accordance with a preferred embodiment thereof, an adjustable energy output/cyclic event filter cleaning control system is provided which includes a main pressurized air storage tank having a supply inlet conduit connectable to a suitable, in-place pressurized air source such as the approximately 90 psig compressed air system typically provided in industrial facilities to power pneumatic hand tools. To adjustably control the system lapse time, a selectively variable flow rate of pressurized air at a pressure higher than the desired system backflushing pressure is continuously delivered to the tank through its inlet conduit by means of an adjustable pressure regulating valve and a downstream, fixed orifice member operatively connected in such conduit. The downstream orifice member establishes an essentially linear relationship between the regulator valve setting and the time required to raise the interior tank pressure from an essentially ambient pressure to the desired backflushing pressure. The system lapse time may accordingly be selectively varied simply by appropriate proportional adjustment of the regulator valve setting.

An adjustable pressure setting actuating valve is interposed in an actuating conduit interconnected between an outlet of the tank and an inlet passage formed within the body of a cyclic control device. The actuating valve is a two position directional control valve which is biased to a closed position in which it precludes pressurized fluid flow from the tank to the actuating device through the actuating conduit, while venting the device's inlet passage via the portion of the actuating conduit downstream from the actuating valve, and is piloted, against its adjustable biasing force, by tank pressure to an open position in which pressurized fluid from the tank is flowed through the actuating conduit to the cyclic control device to be intermittently operated. The backflushing pressure of the system may thus be selectively varied, independently of the lapse time selectively established by the pressure regulator valve setting, simply by adjusting the biasing force on the actuating valve to raise or lower the pilot pressure force required to open it.

The inlets of a series of quick-opening, two position backflushing valves are communicated with the tank interior by separate tank outlet conduits. The control sides of the backflushing valves are connected to a series of normally closed, poppet-type vent valves, carried by the cyclic control device, by separate vent conduits. The backflushing valves are biased toward their open positions, but are normally held in their closed positions by pilot pressure lines interconnected between the tank outlet conduits and the vent conduits of each of the backflushing valves.

The body of the cyclic control device has a cylinder chamber formed therein which reciprocably carries a piston head that is pressure drivable within the chamber between an actuating position and a reset position. The piston head is secured to a piston rod which is in turn connected to a stepping cam member that is rotatable relative to the piston rod and is reciprocable within a cam chamber formed within the body of the cyclic control device. The stepping cam member is of a cylindrical configuration and has formed around its external side surface a generally sawtooth-shaped cam slot which receives a cam follower pin fixedly secured to the control device body.

The piston head divides the cylinder chamber into a blind side portion which communicates with the inlet passage of the cyclic control device. The rod side portion of the cylinder chamber communicates with a uniquely operative reset pressure reservoir, formed within the control device body, via a reset passage also formed within such body. The inlet passage and the reset passage are interconnected by a transfer passage having a check valve disposed therein which precludes fluid flow from the reset passage to the inlet passage. Interposed in the inlet passage between the blind side cylinder chamber portion and the transfer passage is a flow restricting orifice.

During operation of the system, with the piston head, piston rod and stepping cam in their reset position, pressurized air is flowed into the main storage tank to raise its internal pressure toward the established backflushing pressure. During this initial tank charging period of the system cycle, the backflushing valves are held by pilot pressure in their closed positions, and the actuating valve is held in its closed position by its normal biasing force. When the pressure within the tank reaches the backflushing pressure, the actuating valve is piloted to its open position and pressurized tank air is flowed into the cyclic control device inlet passage via the actuating conduit.

Pressurized air entering the inlet passage of the cyclic control device is simultaneously flowed across its internal orifice into the blind side cylinder chamber portion, and across the transfer passage check valve into the reset passage. Pressurized air entering the reset passage simultaneously flows into and pressurizes the rod side cylinder chamber portion and the reset reservoir.

The flow restriction provided by the internal orifice is considerably greater than that of the internal check valve. Accordingly, as pressurized air initially enters the inlet passage, a considerably larger portion of this incoming air is forced into the rod side cylinder chamber portion and the reset reservoir compared to the quantity of air initially entering the blind side cylinder chamber portion.

In this manner, the rod side chamber portion and the reset reservoir are initially pressurized faster than the blind side chamber portion, thereby holding the piston head in its reset position despite the pressure surface differential between the blind side and the rod side face portions of the piston head. However, as the internal pressures in the rod side chamber portion and the reset reservoir approach the pressure of air within the actuating conduit, the pressurized air flow rate into the blind side cylinder chamber portion increases until a pressure differential between the blind side and rod side chamber portions reaches a level sufficient to drive the piston head from its reset position toward its actuating position.

As the piston head is driven toward its actuating position, the pressures in the rod side chamber portion and the reset reservoir are increased, the internal check valve functioning to prevent air flow from the rod side chamber portion or the reset reservoir through the transfer passage into the inlet passage. Movement of the piston head toward its actuating position causes an incremental rotation of the stepping cam member to bring an operating pin thereon into alignment with one of the poppet valves so that as the piston head reaches its actuating position the operating pin engages and opens one of the poppet valves.

Opening of the poppet valve in this manner causes the pressurized air in its associated vent conduit to be vented through the poppet valve, thereby removing the pilot pressure in one of the backflushing valves. In turn, this causes the backflushing valve to be automatically moved by its normal biasing force to its open position. Opening of the backflushing valve causes the rapid discharge of substantially all of the pressurized air within the main storage tank through the valve to backflush one of the filter elements in a particulate filtration system with which the control system of the present invention is operatively associated.

The rapid evacuation of the main storage tank removes the pilot pressure from the actuating valve, thereby permitting its normal biasing force to close the valve. The closure of the actuating valve vents the cyclic control device inlet passage through the valve via the actuating conduit. This venting of such inlet passage causes the pressurized air previously stored within the reset reservoir (and the pressurized air within the reset passage and the rod side cylinder chamber portion) to automatically drive the piston head toward its reset position, while at the same time forcing the air within the blind side cylinder chamber portion outwardly through the inlet passage and the now-vented actuating conduit, against the cushioning back pressure of the internal orifice, until the piston head, the piston rod, and the stepping cam member are pressure driven back to their reset positions, thereby readying the system for its next successive backflushing cycle. On each successive movement of the piston head toward its actuating position, the stepping cam member brings its operating pin portion into opening engagement with the next successive poppet valve.

In the event that a suitable existing source of pressurized air at a sufficient pressure level is unavailable, a selectively variable flow rate of system supply air may be flowed into the main storage tank by means of an air compressor having an adjustable orifice operatively positioned at its inlet to variable restrict the flow rate of air drawn into the compressor inlet. Additionally, this variable flow rate of pressurized supply air into the main storage tank may also be provided utilizing an air compressor having a variable speed drive.

It can be seen from the foregoing that the present invention provides a substantially improved automatic cyclic filter backflushing system which may be operated using either an existing pressurized air supply source or a dedicated system air compressor. The system backflushing pressure and lapse time are selectively, independently and rather precisely adjustable in a simple, straightforward manner. Additionally, the unique provision of the reset storage reservoir eliminates the previous necessity of using failure-prone electrical or mechanical reset devices, and further increases the reset reliability and efficiency of the system due to the fact that incoming tank supply air is not utilized to reset the cyclic control device. It should additionally be noted in this regard that the reset pressure reservoir is positively recharged upon each opening of the adjustable actuating valve. Accordingly, minor leakage from the reset reservoir is not particularly deleterious to system operation because of this sequential recharging feature.

Finally, while the improved cyclic control device of the present invention is particularly useful in automatic cyclic filter backflushing systems, it also provides a relatively inexpensive, very rugged and highly reliable pressure operated control sequencing device which could be utilized in a wide variety of alternate sequencing control applications in which it is desired to sequentially engage and actuate one or more control output devices other than the illustrated poppet valves to create a useful control signal or signals therefrom.

DETAILED DESCRIPTION

Figure 1:
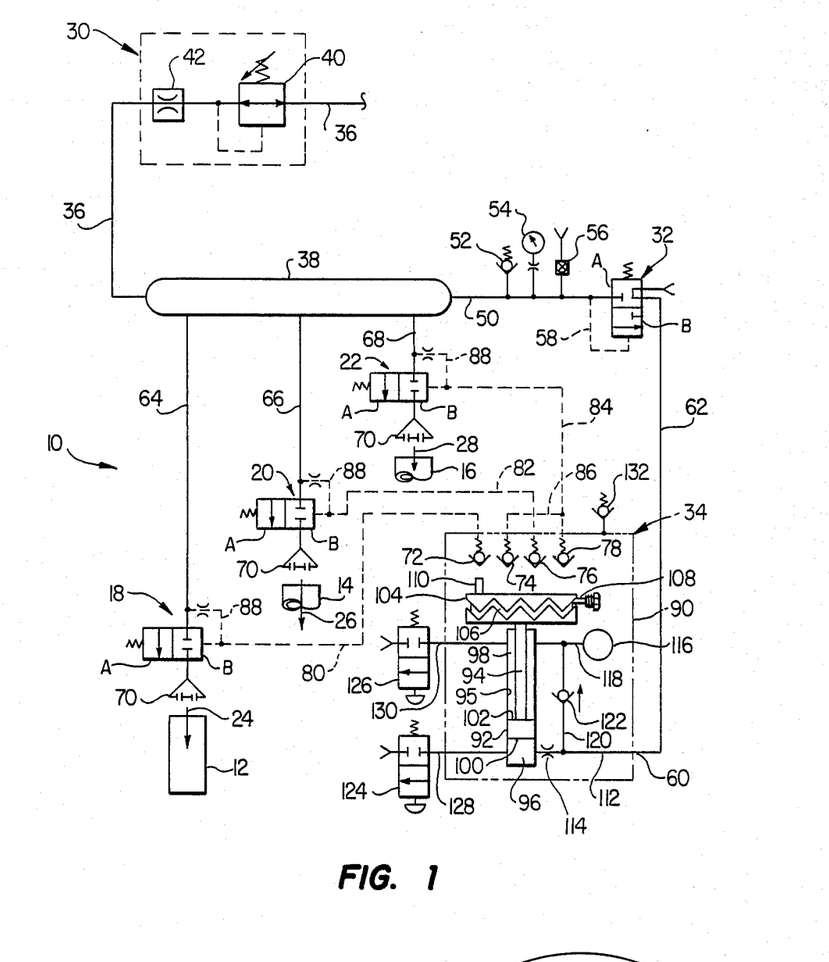
FIG. 1 is schematic diagram of an adjustable energy output/cyclic event filter cleaning valve control system that embodies principles of the present invention.

Schematically depicted in FIG. 1 is an adjustable energy output/cyclic event filter cleaning control system 10 that embodies principles of the present invention. The system 10 is utilized to sequentially backflush, and thus dislodge caked-on dust or other particulate matter from, filter elements 12, 14 and 16 that form a portion of a representative particulate filtration system (of which only the filter elements are illustrated). This backflushing is achieved by sequentially opening three pressure-piloted, normally open, two-position filter backflushing valves 18, 20 and 22 to sequentially direct short duration bursts of pressurized air 24, 26 and 28 in a reverse direction through the interiors of filter elements 12, 14 and 16, respectively. It will be appreciated that the depicted number of filter elements and associated backflushing valves is merely representative and could be increased or decreased as desired to accommodate the filtering and backflushing requirements of a given filtration system.

In addition to the backflushing valves 18, 20 and 22, the primary elements of the system 10 include: a lapse time adjustment mechanism 30 for selectively setting the time lapse between the sequential openings of the backflushing valves 18, 20 and 22; an adjustable pressure setting valve 32 for selectively adjusting the backflushing pressure of the air bursts 24, 26 and 28; and a cyclic control device 34 which functions to sequentially open the backflushing valves in accordance with the sequence lapse time setting of the adjustment mechanism 30 and the pressure setting of the adjustable valve 32 in a manner subsequently described.

The lapse time adjustment mechanism 30 is interposed in a main supply conduit 36 which is connected at its inlet end to an existing source of pressurized air (not shown) such as the approximately 90 psig plant air typically provided to power a variety of pneumatic hand tools, and is connected at its outlet end to a pressurized air storage tank or vessel 38 that is utilized as a main reservoir to receive and then discharge pressurized air at a predetermined backflushing pressure to form the sequential reverse air bursts 24, 26 and 28.

Lapse time adjustment mechanism 30 includes a pressure regulating valve 40 installed in conduit 36, and a fixed orifice member 42 installed in conduit 36 downstream from the valve 40. The valve 40 and the orifice 42 are uniquely utilized to supply pressurized air to the storage tank 38 in a manner bringing its internal pressure from an essentially ambient pressure to a desired system backflushing pressure within in a predetermined time essentially corresponding to the desired lapse time between each sequential opening of the backflushing valves 18, 20 and 22.

This adjustment of the valve-opening sequential lapse time in the system 10 is achieved simply by adjusting the pressure setting of the valve 40. Importantly, by virtue of the orifice 42, the time required to raise the pressure within the tank 38 from an essentially ambient pressure to a desired backflushing pressure less than the plant air pressure used to operate the system 10 is related to the pressure setting of the valve 40 in an essentially linear manner.

As an example, if it is desired to raise the internal pressure of the tank 38 from ambient pressure to a backflushing pressure of 40 psig, a change in the pressure setting of the valve 40 from 45 psig to 90 psig (i.e., within a range of pressures higher than the desired backflushing pressure) would essentially halve the time required to bring the internal tank pressure to the desired level. Similarly, of course, a given percentage reduction in the pressure setting of valve 40 would result in a corresponding percentage increase in the time required to bring the internal tank pressure to a desired level.

It can be seen from the foregoing that by appropriately sizing the fixed orifice 42, the flow rate of pressurized air into the tank 38 through the conduit 36 is made essentially proportional to the pressure setting of the valve 40, thereby providing a very simple but relatively precise method of adjustably regulating the sequential backflushing lapse time of the system 10 as will be subsequently described in greater detail.

The lapse time adjustment mechanism 30 just described is particularly useful where a source of pressurized air (such as the approximately 90 psig plant air referred to) is conveniently available. Given the availability of this in place source of pressurized air at a suitably high pressure level, it is a simple matter to provide the upstream pressure-controlled adjustment of system lapse time merely by furnishing the pressure reducing valve 40 and the fixed orifice 42.

Figure 2:
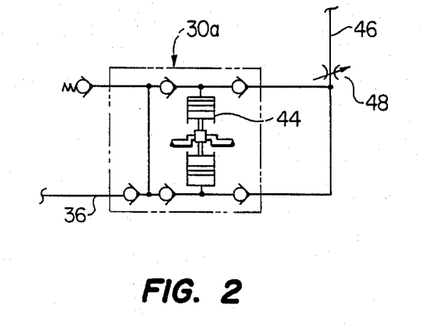
FIG. 2 is a schematic diagram of an alternate pressurized main air supply portion of the system.

In the event, however, that an existing source of pressurized air at a suitable pressure level is not available, an alternate lapse time adjustment mechanism 30a (FIG. 2) may be provided to adjustably regulate the flow rate of pressurized air into the tank 38 in a manner adjustably varying the time required to bring its internal pressure from an ambient level to the required system backflushing pressure, thereby adjustably varying the system lapse time. As illustrated in FIG. 2, the alternate mechanism 30a comprises a fixed speed air compressor 44 which draws ambient air into its inlet via an inlet conduit 46, compresses the received ambient air, and discharges the compressed air into the conduit 36. As described in my U.S. Pat. No. 4,690,166, an adjustable orifice 48 is installed in the inlet conduit 46 and may be adjusted to selectively vary the flow rate of pressurized air delivered from the compressor 44 to the tank 38 to thereby selectively vary the time required to bring the internal tank pressure to a predetermined backflushing level. If desired, the volume rate production of the air compressor 44, and thus the flow rate of its discharge, may be alternatively varied (as also described in my U.S. Pat. No. 4,690,166) by maintaining the orifice 48 at a fixed setting, providing the compressor 44 with a variable speed motor, and then selectively varying its drive speed. In either of these alternate embodiments, the flushing lapse time of the system 10 at any particular backflushing pressure may be set by simply adjusting the volume rate production of the compressor.

Referring again to FIG. 1, an outlet conduit 50 is interconnected between the interior of the tank 38 and the inlet of the adjustable pressure setting valve 32 which is used to set the backflushing pressure of the system 10 and, as later described, to intermittently actuate the cyclic control device 34. Operatively connected in the outlet conduit 50 are a pressure relief valve 52, a fluid pressure gauge 54 and a manual flow valve 56. The valve 32 is an adjustable, two position directional control valve which is normally biased toward its closed position A, but is pressure pilotable to its open position B, against its biasing force, by means of a pressure pilot line 58 interconnected between the conduit 50 and the control side of the valve 32. Interconnected between the outlet side of the valve 32 and an inlet 60 of the cyclic control device 34 is a conduit 62.

With the valve 32 in its normally biased position A, the outer end of the conduit 50 is blocked and the conduit 62 is vented through the valve as indicated in FIG. 1. However, when the pressure in tank 38 reaches the system backflushing pressure level corresponding to the adjustable piloted pressure opening setting of the valve 32, the pressure in the pilot line 58 (which is equal to the pressure within tank 38) drives the valve 32 to its position B in which the conduits 50 and 62 are communicated through the valve. This communication of the conduits 50 and 62 creates an outflow of pressurized tank air sequentially through the conduits 50, 62 and into the cyclic control device 34 to open one of the backflushing valves 18, 20 and 22 and backflush its associated filter element in a manner subsequently described.

It can be readily seen at this point that the system 10 conveniently provides for the simple yet precise selective adjustment, in an independent fashion, of both the lapse time and the backflushing pressure thereof. For example, if it is desired to set the system backflushing pressure at 50 psig, the valve 32 is simply set to be piloted to its B position when the pressure in the pilot line 58 reaches 50 psig. Set in this fashion, the valve 32 assures that regardless of the lapse time between the sequential opening of the backflushing valves 18, 20 and 22, the filter backflushing pressure will be maintained at 50 psig. With the backflushing pressure set at a desired constant level, the lapse time between the sequential opening of the backflushing valves 18, 20 and 22 may be selectively adjusted simply by changing the setting of the pressure regulator valve 40 upstream of the fixed orifice 42. By appropriately correlating the settings of the valves 32 and 40 it can also be seen that the system 10 can be conveniently provided with a fixed lapse time in conjunction with a variety of selected backflushing pressures. In this manner, the system 10 may be advantageously utilized in a very wide variety of filter cleaning applications having diverse lapse time and/or filter backflushing pressure requirements. This system adjustment flexibility is limited only by the available plant air pressure, or the operating characteristics of the compressor as the case may be.

As illustrated in FIG. 1, the backflushing valves 18, 20 and 22 are respectively connected at their inlet sides to the interior of the tank 38 by outlet conduits 64, 66 and 68. In a schematic sense, each of the backflushing valves is a normally open, two position, pressure piloted directional control valve having an open position A toward which the valve is biased, a closed position B, and an outlet portion 70 through which its backflushing air burst is delivered. The backflushing valves can, if desired, be of the quick opening, pneumatically actuated diaphragm type flushing valves illustrated and described in my U.S. Pat. No. 4,690,166.

The control sides of the backflushing valves 18, 20 and 22 are respectively connected to normally closed poppet-type vent valves 72, 76 and 78, incorporated into the cyclic control device 34, by means of vent conduits 80, 82 and 84. For illustrative purposes later described, the vent line 84 is also connected, via a vent branch conduit 86, to a fourth poppet valve 74 also carried by the cyclic control device 34. The tank outlet conduits 64, 66 and 68 are interconnected to their associated vent conduits 80, 82 and 84, respectively, by orificed pilot lines 88. These pilot lines utilize reservoir tank pressure to hold each of the backflushing valves in its closed position B until such valve is, in turn, called upon by the cyclic control device 34 to deliver its backflushing air burst to its associated filter element.

In a manner which will now be described, the cyclic control device 34 utilizes reservoir tank pressure to sequentially open the poppet valves 72, 74, 76 and 78 to thereby vent the conduits 80, 82 and 84 in a predetermined sequence to sequentially create the backflushing air bursts 24, 26 and 28. It can be seen in the diagram of FIG. 1 that the venting of the vent conduit of a particular backflushing valve removes the pilot pressure to such valve and permits its normal biasing force to move it to its open position A to thereby rapidly discharge the pressurized air within the tank 38 through the valve's outlet portion 70. It should be noted that as the cyclic control device 34 sequentially opens the poppet valves 72, 74, 76 and 78, with a predetermined lapse time between such poppet valve openings, the backflushing valves will be opened in the sequence 18, 22, 20 and 22. Thus, in one complete cycle of the device 34, the backflushing valve 22 is opened twice, while the backflushing valves 18 and 20 are opened only once. This illustrative sequence, of course, arises from the provision of the "extra" poppet valve 74 and the vent branch conduit 86. If desired, however, the poppet valve 74 and the vent branch conduit could be eliminated so that during a single complete cycle of the device 34 each of the backflushing valves 18, 20 and 22 would be opened only once. Alternatively, an additional backflushing valve could be added to the illustrative system 10 and the vent conduit 86 could be connected directly to such additional valve so that four backflushing valves could be sequentially opened by the illustrated four poppet valves. It can thus be readily seen that a wide degree of backflushing valve sequencing can be achieved simply by matching or mismatching the number of poppet valves to the number of backflushing valves.

Still referring to the schematic diagram of FIG. 1, the cyclic control device 34 includes a cylinder assembly 90 in which is reciprocably disposed a piston head 92 that is connected to a piston rod 94 and divides the interior of a cylinder bore 95 into a blind side chamber 96 and a rod side chamber 98. The piston head 92 has a blind side face 100 having an effective pressure area substantially identical to the cross-sectional area of the cylinder bore 95, and a rod side face 102 whose effective pressure area is less than that of the blind side face by an amount equal to the cross-sectional area of the piston rod 94.

Rotatably secured to the outer end of the piston rod 94 for reciprocation therewith is a stepping cam member 104 having formed around its external periphery in a manner subsequently described a generally sawtooth-shaped cam slot 106 into which a fixedly positioned cam follower pin 108 extends. During operation of the cyclic control device 34, the piston head 92 is caused to axially reciprocate between its retracted or reset position illustrated in FIG. 1 and an extended or actuating position in which the piston head 92, the rod 94 and the cam member 104 are upwardly displaced toward the poppet valves 72, 74, 76 and 78. With the piston head 92 and its fully extended position, an operator pin 110 secured to the forward face of the cam member 104 is brought into engagement with and opens one of the poppet valves to thereby vent its associated backflushing valve vent conduit and open one of the backflushing valves. On each forward extension of the piston head 92, the cam slot 106 and the cam following pin 108 interact in a manner causing stepwise incremental rotation of the stepping cam member 104 to cause the operator pin 110 to sequentially engage and open the next successive poppet valve.

Sequential reciprocation of the piston head 92 from its retracted position to its extended position and back to its retracted position is effected utilizing pressurized air intermittently delivered to the cyclic control device inlet 60 through the conduit 62. The inlet 60 is communicated with the blind side cylinder chamber 96 via an inlet passage 112 in which a fixed orifice 114 is interposed. Rod side cylinder chamber 98 is communicated with a reset pressure reservoir 116 via a reset passage 118. Extending from the passage 112, upstream from the orifice 114, to the passage 118 is a transfer passage 120 having operatively interposed therein a reverse flow check valve 122 which permits flow through the passage 120 toward the passage 118, but blocks flow in an opposite direction therethrough.

As will be seen, the reset reservoir 116 constitutes an important aspect of the present invention, and is uniquely utilized to pneumatically effect the retraction or resetting of the piston head 92 after one of the poppet valves and its associated backflushing valve have been opened during the cyclic operation of the control system 10.

The cyclic control device 34 may also be provided with manual vent valves 124 and 126 whose inlets are respectively communicated with the cylinder chambers 96 and 98 via suitable conduits or passages 128 and 130. Valves 124 and 126 may be utilized to manually vent these cylinder chambers 96 and 98 when desired. The cyclic control device 34 may also be provided with a cam chamber vent valve 132 which, in a manner subsequently described, is used to vent a chamber within which the stepping cam member 104 is caused to reciprocate.

The unique and quite flexible operation of the control system 10 will now be described in conjunction with the preferred embodiment thereof schematically depicted in FIG. 1. For purposes of analysis, it will be assumed that the system is initially unpressurized so that ambient pressure exists in the storage tank 38, the piston chambers 96 and 98, and in all of the previously described conduits and passages. With the system unpressurized in this manner, the backflushing valves 18, 20 and 22, and the adjustable pressure setting valve 32, are each in their normally biased A positions. It will further be assumed that prior to initiation of system operation the piston head 92 is in its fully retracted or reset position illustrated in FIG. 1.

To initially establish the backflushing pressure of the system 10, the adjustable pressure setting valve 32 is simply set at such pressure value. To establish the desired system lapse time between the sequential openings of the backflushing valves 18, 20 and 22, the pressure regulating valve 40 is set at a pressure control level sufficiently higher than the desired backflushing pressure to cause the internal air pressure within the storage tank 38 to be raised from ambient to the set backflushing pressure level corresponding to the setting of valve 32 in the desired lapse time. (Alternatively, if the air compressor embodiment 30a of the lapse time adjustment mechanism 30 is utilized, this lapse time adjustment would be achieved as previously described by either suitably adjusting the air compressor inlet orifice or adjusting the operational drive speed of the air compressor.)

With the lapse time and backflushing pressure settings established, pressurized air is flowed into the storage tank 38 through the main supply conduit 36. As the pressure within tank 38 increases toward the backflushing pressure setting of the valve 32, the increasing tank pressure is transmitted to the backflushing valve vent conduits 80, 82 and 84 (whose outer ends are closed by the normally closed poppet valves 72, 74, 76 and 78) through the tank outlet conduits 64, 66, 68 and the orificed pilot lines 88. Increasing pressure in the closed vent conduits 80, 82 and 84 causes the backflushing valves 18, 20 and 22 to be piloted to and held in their closed B positions to thereby prevent pressurized air within the tank 38 from flowing outwardly through the backflushing valve outlet portions 70.

At the same time, the increasing tank pressure operates to progressively increase the pressure in the pilot line 58 of the adjustable pressure setting valve 32. At the expiration of the predetermined system lapse time, the air pressure within the tank 38 and the pilot line 58 reaches the system backflushing pressure setting of the valve 32 to thereby cause the air pressure within the pilot line 58 to move the valve 32 to its B position, thereby communicating the conduits 50 and 62. This communication of the conduits 50, 62 flows pressurized air from the tank 38 through the conduits 50, 62 into the inlet 60 of the cyclic control device 34 and then inwardly through its inlet passage 112. Movement of the valve 32 to its B position also prevents the conduit 62 from being vented to atmosphere through the valve 32.

Incoming pressurized air leftwardly traversing the passage 112 simultaneously flows across the orifice 114 into the blind side cylinder chamber 96, and flows upwardly across the check valve 122, via the passage 120, into the reset passage 118. Pressurized air entering the passage 118 simultaneously flows into and pressurizes the cylinder rod side chamber 98 and the reset reservoir 116. The flow restriction provided by the orifice 114 is considerably greater than that of the check valve 122. Accordingly, as pressurized air initially enters the passage 112, a considerably larger portion of this incoming air is forced into the cylinder chamber 98 and reset reservoir 116 compared to the quantity of air initially entering the cylinder chamber 96.

In this manner, the chamber 98 and the reservoir 116 are initially pressurized faster than the cylinder chamber 96, thereby holding the piston head 92 in its fully retracted position despite the previously mentioned pressure surface differential between the piston head faces 100 and 102. However, as the internal pressures in the chamber 98 and the reset reservoir 116 approach the pressure of the air within the conduit 62, the pressurized air flow rate into the cylinder chamber 96 increases until a pressure differential between the chambers 96 and 98 reaches a level sufficient to drive the piston head 92 from its retracted position upwardly toward its fully extended actuating position.

As the piston head is driven toward its fully extended position, the pressures in the cylinder chamber 98 and the reset reservoir 116 are increased, the check valve 122 functioning to prevent air flow from the chamber 98 or the reservoir 116 downwardly through the transfer passage 122 into the inlet passage 112. Movement of the piston head 92 upwardly toward its extended position causes the previously mentioned stepwise rotation of the cam member 104 into alignment with the poppet valve 72 so that as the piston head reaches its fully extended position the operator pin 110 engages and opens the poppet valve 72.

Opening of the poppet valve 72 in this manner causes the pressurized air in vent conduit 80 to be vented through the poppet valve 72, thereby removing the pilot pressure in the orificed pilot line 88 of the backflushing valve 18. In turn, this causes the backflushing valve 18 to be automatically moved by its normal biasing force to its open position A. Opening of the backflushing valve 18 in this manner causes the rapid discharge of substantially all of the pressurized air within the tank 38 through the outlet portion 70 of the valve 18, via the tank outlet conduit 64, to create the high pressure reverse air burst 24 through the filter element 12 to dislodge built-up particulate matter from its exterior surface.

This rapid evacuation of the tank 38 removes the pilot pressure from within the pilot line 58 of the pressure setting valve 32, thereby causing its normal biasing mechanism to shift it back to its A position indicated in FIG. 1. As previously mentioned, with the valve 32 in its A position, the valve precludes flow from the conduit 50 to the conduit 62 and at the same time vents the conduit 62 to atmosphere through the valve. Venting of the conduit 62 causes the pressurized air within the reset reservoir 116 (and the pressurized air within the passage 118 and the cylinder chamber 98) to reset the piston head 92 by driving it downwardly toward its fully retracted position, while at the same time forcing the air within the cylinder chamber 96 outwardly through the inlet passage 112 and the now-vented conduit 62, against the cushioning back pressure of the orifice 114, until the piston head 92, the rod 94 and the cam member 104 are returned to their fully retracted positions depicted in FIG. 1.

It is important to note at this point that the unique provision of the reset reservoir 116 totally eliminates the previous necessity of providing a return spring or other mechanical device to drive the piston head back to its retracted position upon completion of its poppet valve-opening forward extension stroke. The reset reservoir 116 also eliminates the previous alternate necessity of utilizing primary system supply air to simultaneously pressurize the oppositely disposed cylinder chambers 96 and 98 during charging of the tank 38. Instead, the uniquely operative reset reservoir 116 functions to automatically and very reliably reset the piston head 92 immediately following the opening of any of the backflushing valves 18, 20 and 22 without the necessity of communicating the tank interior with the cyclic control device 34 during subsequent pressurization of the tank 38.

It will be appreciated that the reset reservoir 116 may be appropriately sized to not only drive the piston head 92 back to its fully retracted position, but may also be sized to maintain a residual positive pressure within the cylinder chamber 98 of sufficient magnitude to positively hold the piston head 92 in its retracted position until the valve 32 is opened again to initiate the opening of the next successive flushing valve. It should also be noted that wile it is anticipated that the reservoir 116 can continuously create this piston head holding pressure, minor leakage in the reset system is not particularly deleterious to its operation since the reservoir 116 is fully and automatically recharged again upon each opening of the valve 32.

As previously mentioned, each time the piston head 92 is moved to its fully extended actuating position, the cam member 104 is rotated in a stepwise fashion to bring the operator pin 110 into alignment with the next successive poppet valve to thereby open the poppet valves, and thus the backflushing valves, in a predetermined sequence. While the cyclic control device 34 is particularly useful in sequencing the opening of a series of poppet valves and backflushing valves as previously described, it will also be readily appreciated that the principles incorporated in the device could also be utilized in conjunction with a single poppet valve and associated backflushing valve by eliminating the cam and follower mechanism and simply causing, for example, the outer end of the piston rod 94 to be reciprocated into and out of engagement with a single poppet valve.

It is also important to note that while the device 34 may be advantageously utilized in controlling the sequential opening and closing of one or more filter backflushing valves, it also provides a relatively inexpensive, very rugged and highly reliable pressure operated control sequencing device which could be utilized in a wide variety of alternate sequencing control applications in which it is desired to sequentially engage and actuate one or more control output devices other than the illustrated poppet valves to create a usable control signal or signals therefrom.

Figure 3:
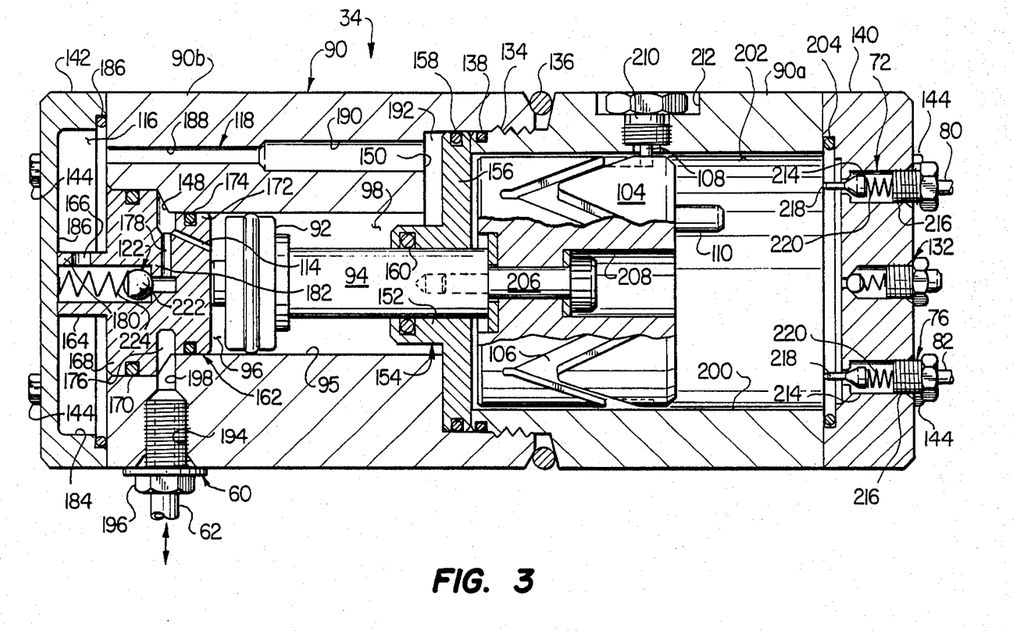
FIG. 3 is a partially sectioned, partially elevational view through a filter cleaning valve cyclic control device utilized in the system, with an internal piston portion of the device being in its fully retracted position.
Figure 4:
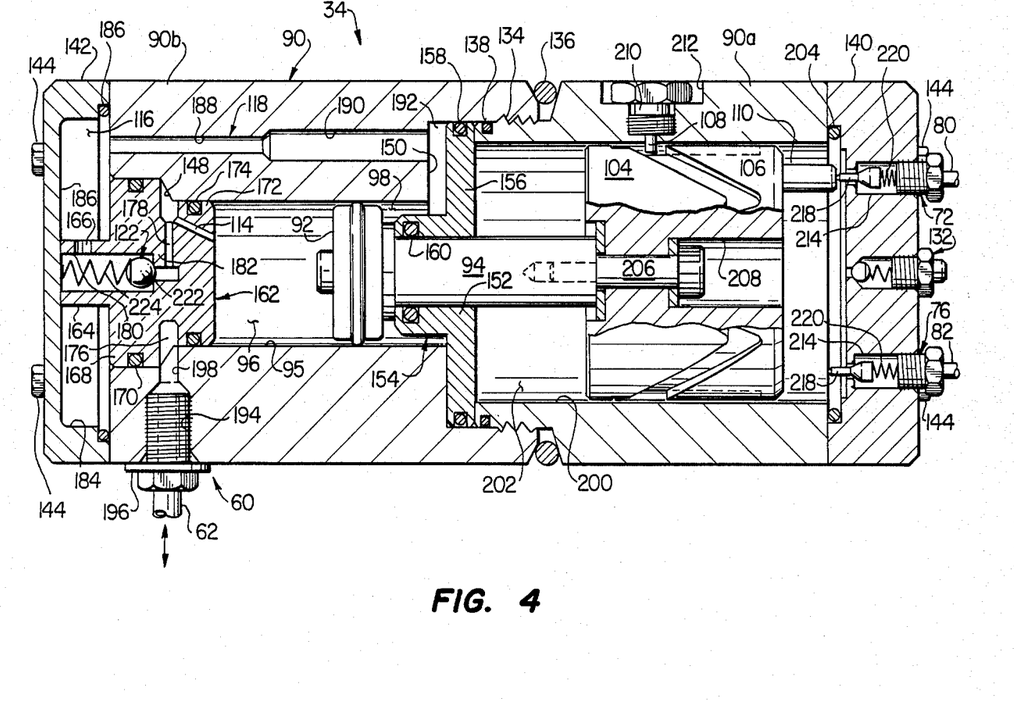
FIG. 4 is a view through the cyclic control device similar to that in FIG. 3 but with the internal piston portion being in its fully extended position.
Figure 5:
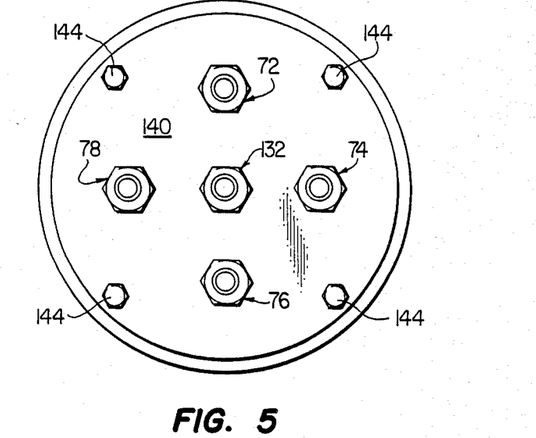
FIG. 5 is a right end view of the cyclic control device of FIGS. 3 and 4.

Turning now to FIGS. 3–5, a preferred structural embodiment of the cyclic control device 34 schematically depicted in FIG. 1 will be described. The device depicted in FIGS. 3–5 is similar in many structural and functional aspects to the timing actuator illustrated and described in my U.S. Pat. No. 4,465,497 which may be referred to for further structural and operational description if desired. However, the cyclic control device 34 is of a somewhat simplified construction, and further integrally incorporates the unique remote reset reservoir 116, and its associated flow control devices and passageways, therein.

Referring first to FIG. 3, in which the piston head 92, the piston rod 94, and the stepping cam member 104 are in their fully retracted positions, it can be seen that the cylinder assembly or body 90 is formed from hollow cylindrical forward and rear cylinder sections 90a and 90b which are threadedly intersecured, as by threads 134, at their facing inner end portions and are externally and internally sealed by O-ring seals 136 and 138, respectively. The open outer ends of the interconnected cylinder sections 90a and 90b are respectively closed by end caps 140 and 142 secured thereto by connecting bolts 144. The cylinder section 90b has formed therein the cylinder bore 95 which slidably and sealingly receives the piston head 92. The left end portion of the bore 95 is enlarged to form an annular interior shoulder 148, while a right end portion of the bore 95 is enlarged to form a wider annular interior shoulder 150. The piston rod 94 is slidingly received in the annular tub portion 152 of a piston rod guide 154 having an annular flange portion 156 clamped between the inner end of the cylinder section 90a and the shoulder 150. The flange 156 is sealed to the interior of the cylinder section 90b by an O-ring 158, while the tub portion 152 is sealed to the piston rod 94 by an O-ring seal 160.

Capitively retained within the cylinder assembly or body 90 to the left of the piston head 92 is a spool member 162. Spool member 162 has a hollow cylindrical left end portion 164 with a radial opening 166 formed therethrough, a cylindrical intermediate section 168 received in the enlarged left end portion of the bore 95 and sealed thereto by an O-ring seal 170, and a somewhat smaller diameter cylindrical right end section 172 received in the bore 95 and sealed thereto by an O-ring seal member 174. The spool sections 168 and 172 define therebetween an annular groove 176 which communicates via a radially extending spool passage 178 with a stepped bore 180 extending inwardly through the left end portion 164 of the spool and defining therein an annular valve seat 182.

The reset reservoir 116 is defined within the left end cap 142 by a large circular bore 184 extended inwardly through its inner surface, the end cap 142 being sealed to the left end of the cylinder section 90b by an O-ring seal element 186. As illustrated, the spool member 162 is clamped between the inner end surface 186 of the end cap 142 and the internal shoulder 148, with the outer end of the spool section 164 bearing against the surface 186, and the intermediate spool section 168 bearing against the internal shoulder 148. The reset reservoir 116 communicates with the interior of the left end section 164 of the spool member 162 through the radial passage 166, and also communicates with the rod side cylinder chamber 98 via elongated coaxial bores 188, 190 and a radial slot 192 formed in the rod guide flange 156, the bores 188 and 190 defining with the slot 192 the passage 118 schematically depicted in FIG. 1. The orifice 114 is formed at an angle through the right end section 172 of the spool member and intercommunicates the annular spool groove 176 with the blind side cylinder chamber 96.

The inlet 60 of the device 34 is defined by an internally threaded radial bore 194 formed through the cylinder section 90b and having its axis aligned with the annular spool member groove 176. A suitable inlet fitting 196 is threaded into the bore 194 and is in turn connected to the conduit 62. At the inner end of bore 194 is formed a smaller diameter bore 198 whose open inner end is aligned with and communicates with the annular spool groove 176.

Formed in the interior of the cylinder section 90a is a cylindrical axial bore 200 which is of a larger diameter than the bore 95 and defines in the cylinder section 90a a cam chamber 202 bounded at its left end by the rod guide flange 156 and bounded at its right end by the end cap 140 which is sealed to the right end of the cylinder section 90a by an O-ring seal element 204. The cylindrical stepping cam member 104 is slidably mounted in the cam chamber 202 for reciprocating movement between the flange 156 and the end cap 140 in response to pressure-driven reciprocation of the piston head 92. The cylindrical cam member 104 is connected to the right end of the piston rod 94, and journalled for rotation relative thereto, by a recessed retainer shaft 206 that is received within a stepped axial bore 208 formed in the cam member 104, the retainer shaft being threaded into the right end of the piston rod 94 as indicated. The cam follower pin 108, which is operatively received within the cam slot 106 extending around the external side periphery of the cylindrical cam member 104, is formed on the inner end of a threaded plug member 210 which is threaded into a radial recess 212 formed in the outer side surface of the cylinder section 90a.

As illustrated in FIGS. 3 and 5, the poppet valves 72, 74, 76 and 78 are positioned in a generally circular array around the right end cap 140, each of the poppet valves including a circular bore 214 extending axially into the end cap 140, a hollow plug member 216 threaded into the outer end of the bore 214 and connected to one of the backflushing valve vent conduits, a plunger element 218 movably positioned within the open inner end of the bore 214 and biased to a closing position therein by a spring element 220 positioned within the bore 214. Extending centrally through the end cap 140 is the cam chamber vent valve 132 which may simply be a small spring loaded outlet ball check valve as indicated.

It can be seen by comparing FIGS. 1 and 3 that the preferred embodiment of the cyclic control device 34 depicted in FIG. 3 operates in the following manner. When the adjustable pressure setting valve 32 (FIG. 1) is piloted to its open position B, pressurized tank air forced through the conduit 62 enters the inlet 60 and is forced into the annular spool groove 176 through the internal bore 198. Pressurized air entering the groove 176 is simultaneously forced through the orifice 114 into the blind side cylinder chamber 96 and, via the radially spool passage 178 into the small diameter portion of the axial spool bore 180 upstream from the valve seat 182.

The pressurized air which enters this interior bore portion of the spool opens the check valve 122 which is defined by a small valve ball 222 that is biased into closing engagement with the valve seat 182 by a spring element 224.

After the pressurized air opens and leftwardly traverses the check valve 122, it is forced into the reset reservoir 116 through the radial passage 166 and is then forced into the rod side cylinder chamber 98 sequentially through the bores 188, 190 and the rod guide flange slot 192. As previously described in conjunction with the schematic diagram of FIG. 1, there is an initial buildup of pressure within the reservoir 116, the cylinder chamber 98 and their interconnecting passageway system, followed by a corresponding pressure build up within the cylinder chamber 96 to cause the piston head 92, the rod 94 and the cam member 104 to be driven through their extension stroke to their fully extended actuating positions depicted in FIG. 4. During the rightward translation of these elements, the cam 104 is rotated in stepwise fashion as indicated in FIG. 4 so that the operator pin 110 is brought into engagement with and depresses the plunger portion 218 of the poppet valve 72, thereby opening the inner end of the bore 214 of poppet valve 72 and causing the vent conduit 80 to exhaust the pressurized air therein into the cam chamber 202 Entry of this pressurized vent conduit air into the cam chamber 202 opens the relief valve 132 and vents the pressurized air from the cam chamber 202 outwardly through the valve 132 to atmosphere. As previously described, the venting of the conduit 80 opens the backflushing valve 18, after which the valve 32 (FIG. 1) is shifted to its position A thereby venting the conduit 62 and causing the stored, pressurized air within the reset reservoir 116 to drive the piston head 92, the piston rod 94, and the cam member 104 leftwardly through their retraction stroke to their reset positions illustrated in FIG. 3 to ready the system 10 for its next backflushing cycle.

It can be seen from the foregoing that the present invention provides an improved adjustable energy output/cyclic event filter cleaning control system which is uniquely adjustable to selectively and independently vary both its lapse time and its backflushing pressure, the system being advantageously provided with an automatic reset reservoir incorporated in an improved and simplified cyclic control device. The system may be powered by either an in-place source of pressurized air such as that normally used to power a variety of pneumatic hand tools, or may alternatively be powered by an air compressor having an adjustable inlet orifice and/or a variable speed drive motor.

The foregoing detailed description is to be clearly understood as being given by way of illustration and example only, the spirit and scope of the present invention being limited solely by the appended claims.

What is claimed is:

1. Apparatus for cyclically backflushing a filter element portion of a particulate filtration system, said apparatus being adjustable to selectively and independently vary its backflushing pressure and backflushing cycle lapse time and comprising:
   storage reservoir means for receiving pressurized fluid;
   adjustable fluid supply means for supplying a selectively variable flow rate of pressurized fluid to said storage reservoir means to raise its internal pressure from an essentially ambient pressure to a desired backflushing pressure in a predetermined, selectively variable period of time;
   backflushing valve means communicating with the interior of said storage reservoir means and being normally held in a closed position, said backflushing valve means being operative to be cyclically opened to rapidly discharge pressurized fluid at said backflushing pressure from said storage reservoir means through said filter element portion;
   control means for utilizing pressurized fluid to drive a portion thereof between actuating and reset positions to respectively open said backflushing valve means and permit closure thereof;
   actuating means adjustable to deliver pressurized fluid from said storage reservoir means to said control means, to drive said portion thereof to said actuating position, when the pressure in said storage reservoir means reaches said desired backflushing pressure, and being operative in response to opening of said backflushing valve means to permit said control means portion to be pressure driven to said reset position; and
   reset reservoir means for receiving and storing a portion of the pressurized fluid delivered from said storage reservoir means to said control means by said actuating means, and then utilizing said portion of the delivered pressurized fluid to drive said control means portion from said actuating position to said reset position in response to opening of said backflushing valve means.

2. The apparatus of claim 1 wherein said adjustable fluid supply means include:
   conduit means for intercommunicating the interior of said storage reservoir means with a source of pressurized fluid;
   an adjustable pressure regulating valve operatively connected in said conduit means, and
   orifice means, operatively connected in said conduit means between said pressure regulating valve and said storage reservoir means, for establishing an essentially linear relationship between the setting of said pressure regulating valve and said period of time.

3. The apparatus of claim 2 wherein:
   said orifice means comprise a fixed orifice member.

4. The apparatus of claim 1 wherein said adjustable fluid supply means include:
   fluid compressor means having an outlet communicating with the interior of said storage reservoir means, and an inlet, and
   adjustable inlet orifice means operatively associated with said fluid compressor means inlet for selectively regulating the flow rate of fluid drawn inwardly therethrough.

5. The apparatus of claim 1 wherein said adjustable fluid supply means include:
   fluid compressor means having an outlet communicating with the interior of said storage reservoir means, and
   means for selectively varying the drive speed of said fluid compressor means.

6. The apparatus of claim 1 wherein:
   said adjustable fluid supply means have an outlet portion communicating with the interior of said storage reservoir means and adapted to discharge pressurized fluid at a pressure higher than said desired backflushing pressure.

7. The apparatus of claim 1 wherein said actuating means include:
   conduit means interconnected between said storage reservoir means and said control means for flowing pressurized fluid from said storage reservoir means to said control means to actuate the same, and
   valve means connected in said conduit means, said valve means being biased to a closed position when the pressure in said storage reservoir means is below said desired backflushing pressure, and piloted to an open position by pressure within said storage reservoir means when the pressure therein reaches said desired backflushing pressure,
   said valve means in said closed position being operative to prevent pressurized fluid flow from said storage reservoir through said conduit means while permitting pressurized fluid from said control means to be vented through said valve means via said conduit means,
   said valve means in said open position permitting pressurized fluid flow from said storage reservoir means through said conduit means to said control means, and
   means for selectively varying the piloted opening pressure of said valve means to thereby selectively vary the backflushing pressure of said apparatus.

8. The apparatus of claim 1 wherein:
   said backflushing valve means comprise a plurality of backflushing valves, and
   said control means are responsive to successive movements of said portion thereof to said actuating position to individually open said plurality of backflushing valves in a predetermined sequence.

9. Apparatus for cyclically backflushing a filter element portion of a particulate filtration system, said apparatus being adjustable to selectively and independently vary its backflushing pressure and backflushing cycle-lapse time and comprising:
   storage reservoir means for receiving pressurized fluid;
   adjustable fluid supply means for supplying a selectively variable flow rate of pressurized fluid to said storage reservoir means to thereby raise its internal pressure from an essentially ambient pressure to a desired backflushing pressure in a predetermined, selectively variable period of time, said adjustable fluid supply means including:
   conduit means for intercommunicating the interior of said storage reservoir means with a source of pressurized fluid,
   an adjustable pressure regulating valve operatively connected in said conduit means to discharge thereinto pressurized fluid at a selectively variable pressure higher than said desired backflushing pressure, and
   orifice means, interposed in said conduit means between said pressure regulating valve and said storage reservoir means, for establishing an essentially linear relationship between the setting of said pressure regulating valve and said period of time;
   backflushing valve means communicating with the interior of said storage reservoir means and being normally held in a closed position, said backflushing valve means being operative to be cyclically opened to rapidly discharge pressurized fluid at said backflushing pressure from said storage reservoir means through said filter element portion;
   adjustable valve means for selectively varying the backflushing pressure of said apparatus, said valve means being operative to create a pressurized fluid outflow from said storage reservoir means when the pressure therein reaches said backflushing pressure and then terminate said outflow when the pressure within said storage reservoir means falls below said backflushing pressure; and
   control means intermittently operable by said pressurized fluid outflow to open said backflushing valve means and then permit closure therof.

10. The apparatus of claim 9 wherein:
    said orifice means comprise a fixed orifice member.

11. The apparatus of claim 9 wherein:
    said backflushing valve means comprise a plurality of backflushing valves, and
    said control means are intermittently operable by said pressurized fluid outflow to individually open, and then permit closure of, said plurality of backflushing valves in a predetermined sequence.

12. The apparatus of claim 9 wherein:
    said control means are resettable after each opening of said backflushing valve means, and
    said apparatus further comprises reset reservoir means for receiving and storing a portion of said pressurized fluid outflow and, in response to opening of said backflushing valve means, for utilizing the stored portion of said pressurized fluid outflow to reset said control means.

13. An adjustable energy output/cyclic event filter cleaning system for sequentially backflushing filter portions of a particulate filtration system, comprising:
    a main pressurized fluid storage vessel;
    adjustable fluid supply means for supplying a selectively variable flow rate of pressurized fluid to said storage vessel to thereby raise its internal pressure from an essentially ambient pressure to a desired backflushing pressure in a predetermined, selectively variable period of time;
    a plurality of backflushing valves each having an inlet communicating with the interior of said storage vessel, and an outlet adapted to rapidly discharge pressurized storage vessel fluid through one of said filter portions when the valve is open, said backflushing valves being biased toward open positions, but being pressure piloted to closed positions by fluid pressure in said storage vessel;
    cyclic control means intermittently pressure operable to sequentially open, and then permit piloted closure of, each of said backflushing valves, said cyclic control means including:
    a cylinder chamber,
    a piston carried in said cylinder chamber for pressure driven reciprocation therein between an actuating position and a reset position, said piston having a piston rod secured thereto for reciprocation therewith, said piston further dividing said cylinder chamber into a blind side portion and a rod side portion,
    a plurality of normally closed vent valves each operatively connected to an associated backflushing valve by a pilot vent conduit, whereby opening of a vent valve exhausts pressure from its associated vent conduit to thereby remove pilot closing pressure from its associated backflushing valve and permit its normal biasing force to move it to its open position, an inlet passage for intermittently receiving and then venting pressurized fluid to respectively force said piston to its actuating position and then permit said piston to be returned to its reset position, said inlet passage having an orifice therein and communicating with said blind side portion of said cylinder chamber, a reset storage reservoir communicating with said rod side portion of said cylinder chamber through a reset passage and adapted to receive and store a portion of the pressurized fluid flowing inwardly through said inlet passage, and then discharge the stored fluid into said rod side portion of said cylinder chamber through said reset passage, during outflow of pressurized fluid through said inlet passage, to drive said piston to said reset position, a transfer passage interconnected between said reset passage and said inlet passage upstream from said orifice, a check valve interposed in said transfer passage and operative to permit fluid flow from said inlet passage to said reset passage but preclude fluid flow from said reset passage to said inlet passage, and operating means for sequentially engaging and opening said vent valves in response to successive movements of said piston to its actuating position; and actuating means adjustable to deliver pressurized fluid from said storage vessel to said inlet passage, to drive said piston to its actuating position and charge said reset storage reservoir, when the pressure in said storage vessel reaches said desired backflushing pressure, and being operative in response to opening of one of said backflushing valves to permit said piston to be pressure driven to said reset position by pressurized fluid stored in said reset storage reservoir, said actuating means including:

actuating conduit means interconnected between said storage vessel and said inlet passage for flowing pressurized fluid from said storage vessel to said inlet passage, and actuating valve means connected in said actuating conduit means, said actuating valve means being biased to a closed position when the pressure in said storage vessel is below said desired backflushing pressure, and piloted to an open position by pressure within said storage vessel when the pressure therein reaches said desired backflushing pressure, said actuating valve means in said closed position being operative to prevent pressurized fluid flow from said storage vessel through said actuating conduit means while permitting pressurized fluid from said inlet passage to be vented through said actuating valve means via said actuating conduit means, said actuating valve means in said open position permitting pressurized fluid flow from said storage vessel through said actuating conduit means to said inlet passage, and means for selectively varying the piloted opening pressure of said actuating valve means to thereby selectively vary the backflushing pressure of said apparatus.

14. The system of claim 13 wherein said adjustable fluid supply means include:

supply conduit means for intercommunicating the interior of said storage vessel with a source of pressurized fluid, an adjustable pressure regulating valve operatively connected in said supply conduit means, and orifice means, operatively connected in said supply conduit means between said pressure regulating valve and said storage vessel, for establishing an essentially linear relationship between the setting of said pressure regulating valve and said period of time.

15. The system of claim 14 wherein:

said orifice means comprise a fixed orifice member.

16. The system of claim 13 wherein said adjustable fluid supply means include:

fluid compressor means having an outlet communicating with the interior of said storage vessel, and an inlet, and adjustable inlet orifice means operatively associated with said fluid compressor means inlet for selectively regulating the flow rate of fluid drawn inwardly therethrough.

17. The system of claim 13 wherein said adjustable fluid supply means include:

fluid compressor means having an outlet communicating with the interior of said storage vessel, and means for selectively varying the drive speed of said fluid compressor means.

18. The system of claim 13 wherein:

said adjustable fluid supply means have an outlet portion communicating with the interior of said storage vessel and adapted to discharge pressurized fluid at a pressure higher than said desired backflushing pressure.

19. A pressure operable cyclic control device comprising:

a body having a chamber formed therein;

piston means mounted in said chamber for pressure driven reciprocation therein between an actuating position and a reset position, said piston means dividing said chamber into first and second opposite portions;

inlet passage means, communicating with said first portion of said chamber, for intermittently receiving and then venting a flow of pressurized fluid from a source thereof to respectively drive said piston means to said actuating position and then permit said piston means to be pressure driven to said reset position;

reset passage means for flowing pressurized fluid into said second portion of said chamber to drive said piston means to said reset position during outflow of pressurized fluid through said inlet passage means;

reset storage reservoir means for receiving and storing a portion of the pressurized fluid intermittently flowed inwardly through said inlet passage means and then flowing the stored fluid through said reset passage means into said second portion of said chamber, after said piston means have been driven to said actuating position, in a manner driving said piston means to said reset position using only stored fluid in said reset storage reservoir means, thereby resetting said device;

transfer passage means connected to said inlet passage means for flowing a portion of the pressurized fluid intermittently flowed inwardly therethrough into said reset storage reservoir means to charge the same;

check valve means interposed in said transfer passage means for preventing pressurized fluid flow therethrough from said reset storage reservoir means to said inlet passage means;

orifice means, interposed in said inlet passage means between said transfer passage means and said first portion of said chamber, for restricting inflow and outflow of pressurized fluid through said inlet passage means;

control output means carried by said body, said control output means being operatively engageable to generate a control output signal; and engagement means for operatively engaging and then being disengaged from said control output means in response to movement of said piston means toward and away from said actuating position, respectively.

20. The device of claim 19 wherein:

said inlet passage means, said reset passage means, said reset storage reservoir means, said transfer passage means, said check valve means, and said orifice means are positioned within said body.

21. The device of claim 19 wherein:

said control output means comprise a plurality of output control devices, and said engagement means include a stepping cam member carried within said body by said piston means for rotation relative thereto, an engagement member carried by said stepping cam member, cam slot means formed in said stepping cam member, and cam follower means, carried by said body and received within said cam slot means, for creating stepwise rotation of said stepping cam member during movement of said piston means in a manner causing said engagement member to sequentially engage said plurality of output control devices in response to successive movements of said piston means to said actuating position.

22. The device of claim 21 wherein:

said control devices are normally closed valves each adapted to be opened upon engagement by said engagement member.

* * * * *